United States Patent [19]

West

[11] 4,157,072
[45] Jun. 5, 1979

[54] COMBINATION PRESSURE-VACUUM RELIEF AND ANTIPOLLUTION VALVE

[75] Inventor: Harold H. West, Seattle, Wash.
[73] Assignee: APV Corporation, Seattle, Wash.
[21] Appl. No.: 875,282
[22] Filed: Feb. 6, 1978
[51] Int. Cl.² ............................................. B63B 25/08
[52] U.S. Cl. .................................. 114/74 R; 137/81; 137/493
[58] Field of Search ............. 114/74 R, 212; 137/81, 137/493, 493.9; 220/202

[56] References Cited

U.S. PATENT DOCUMENTS

| | | | |
|---|---|---|---|
| 663,947 | 12/1900 | Warsing | 251/113 |
| 1,498,358 | 6/1924 | Krafft | 137/493.9 |
| 2,285,655 | 6/1942 | Heinemann | 137/81 |
| 2,408,836 | 10/1946 | Warner | 137/81 |
| 2,453,812 | 11/1948 | Phelan | 137/81 |
| 3,545,465 | 12/1970 | Zadoo | 137/81 |
| 3,859,944 | 1/1975 | Warner | 114/74 R |
| 3,868,921 | 3/1975 | Seymour et al. | 114/74 R |
| 3,974,850 | 8/1976 | Pierson | 137/493.9 |

Primary Examiner—Trygve M. Blix
Assistant Examiner—Jesus D. Sotelo
Attorney, Agent, or Firm—Seed, Berry, Vernon & Baynham

[57] ABSTRACT

A combination venting and antipollution device for a shipboard liquid storage tank. A closure wall divides the vent conduit into a lower tank chamber in direct communication with the tank and an upper vent space in direct communication with the vent opening. A spring-urged valve closure member opens or closes an opening through the closure wall. Low pressure in the tank moves the valve closure member down into a lower open position, to admit air or other fluid to the tank; high pressure in the tank moves the valve closure member up into an upper open position to vent air from the tank. A hydrostatic pressure chamber open to the atmosphere houses a sealed bellows, and a spill-lock valve secured to the bellows normally opens to the vent a spill-lock chamber on the vent side of the valve closure member. However, when the pressure in the pressure chamber (or manual action) compresses the bellows (as when the ship sinks), the bellows moves the spill-lock valve to close the connection to the vent and cause the fluid from the tank chamber to flow into the spill-lock chamber, to bear upon a spill-lock piston there. In this condition, the tank pressure acts on the spill-lock piston to prevent the valve closure member from moving up into its upper position until the pressure in the tank chamber is well above that then present in the vent space, but the tank pressure does not restrain the valve closure member from moving down into its lower open position. Salvage operation is also provided for.

24 Claims, 8 Drawing Figures

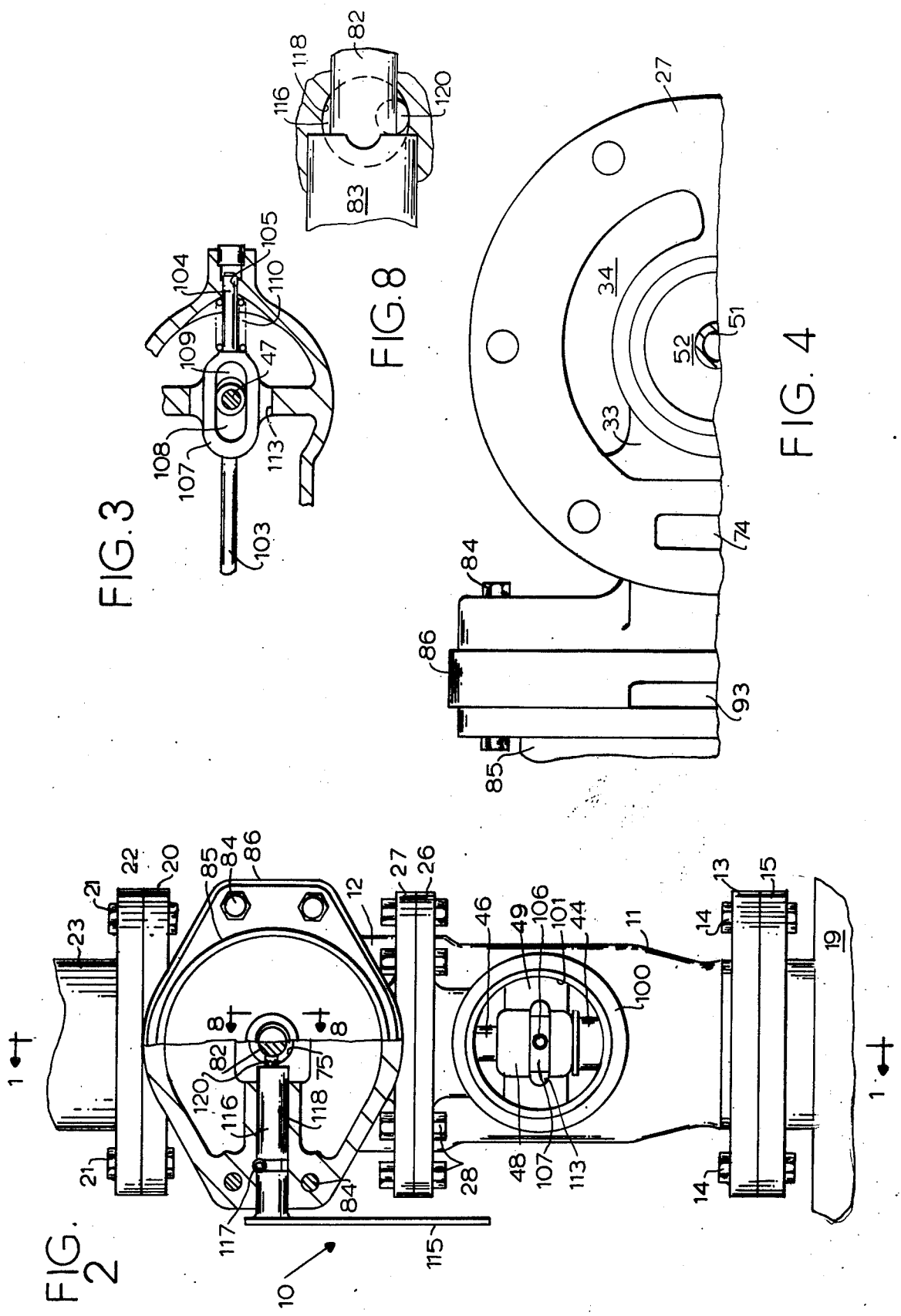

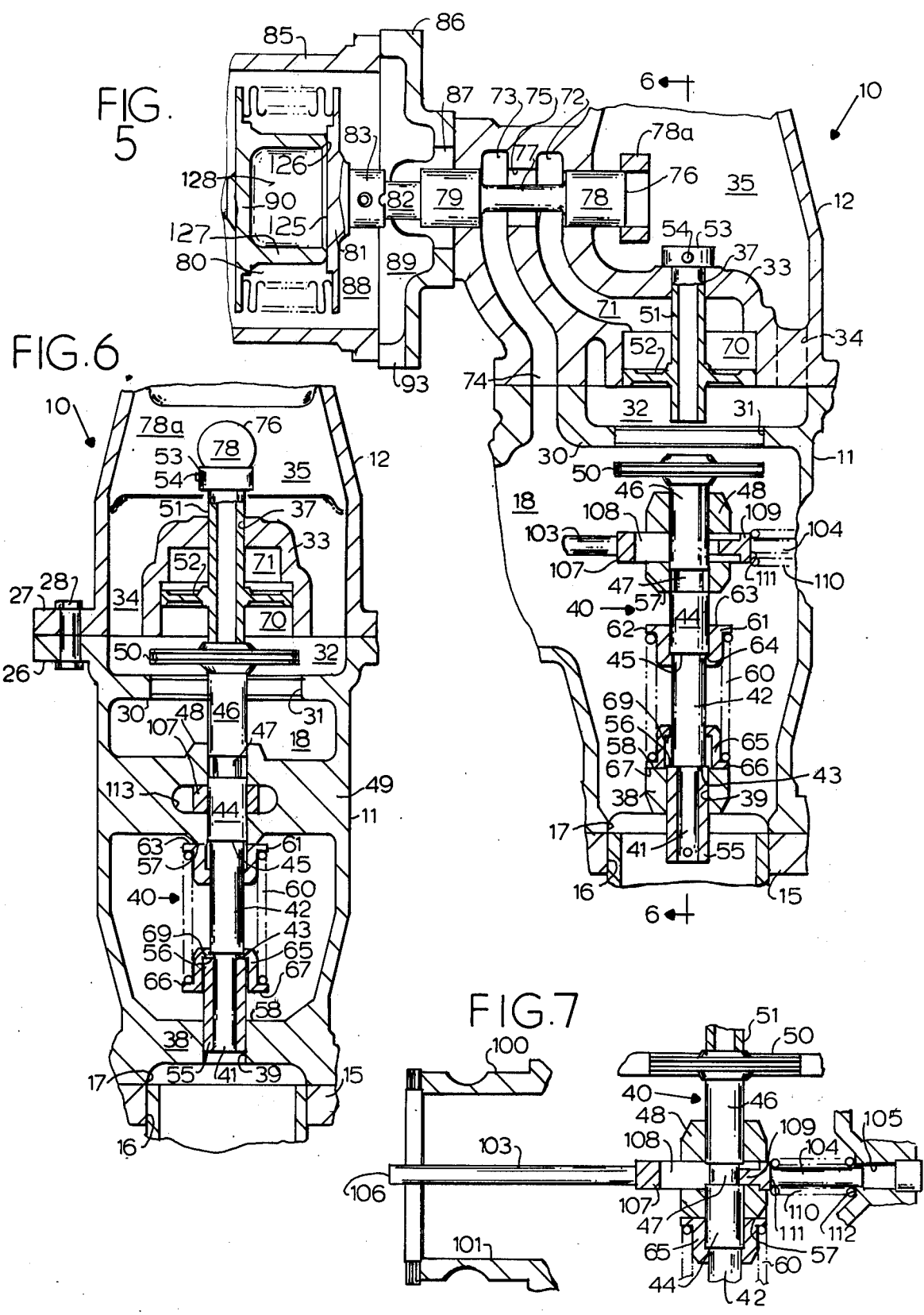

COMBINATION PRESSURE-VACUUM RELIEF AND ANTIPOLLUTION VALVE

BACKGROUND OF THE INVENTION

This invention relates to the prevention of the pollution of navigable waters and adjoining loci which occurs when polluting fluids leak from tanks of sinking and sunken vessels.

Liquid cargo and bunker tanks aboard a ship as parts of the ship's structure have long been provided with vents and overflow pipes, mainly to enable the escape of air from the tanks during the filling and vacating operations, to prevent harmful vacuum conditions during off-loading, and to avoid the buildup of high pressures in the tanks during loading. The overflow pipes also keep the ship's structure from being subjected to excessive pressures in the event of overfilling. Usually, the overflow pipes terminate in a gooseneck about three or four feet above the deck, depending on the depth of the tank. Some vent pipes may terminate at higher levels to avoid the accumulation of noxious or explosive gases at the deck level.

These vents and overflow conduits provide free venting at all times, for heretofore no valves or other restrictions have been incorporated in them. The American Bureau of Shipping does, however, require a device for closing the openings in an emergency. This closure device has generally been located at the end of the gooseneck and typically has comprised a floating ball check or hinged flap, operable either by hand or by the force of a submerging wave washing over the deck. Wooden plugs have often been inserted during heavy weather. Other types of closures have also been in use, but all these closure devices have been meant solely to prevent the entrance of seawater during temporary conditions of heavy weather when green water washes over the decks. In addition, vents from tanks of gasoline and other volatile liquids have been provided with screen-type flame arresters.

The present invention, however, is also concerned with what happens when a ship sinks and carries down tanks containing liquid petroleum products, chemicals, or other liquids which may be a source of pollution. Should the ship sink, many of her tanks will remain intact structurally, and in fact, all may be intact if the sinking is solely due to flooding of reserve buoyancy compartments, such as the engine spaces or other dry compartments of the ship.

In the past, if a vessel were to sink while her vents were open, as more often than not was the case, then as she sank, water entered the tanks and replaced any air volume above the liquid, while that air escaped through the vents. Air that could not escape, being pocketed or trapped, was then compressed. As the ship sank to greater depths, water continued to enter the tanks, further compressing trapped air until the pressure inside the tank became equal to that of the surrounding sea. Water, being of higher density than the gasoline, oil, or other petroleum or chemical products, settled to the bottom of the tank, forcing the petroleum products up and making them flow out from the overflow pipe, as more water seeped in to replace the oil. Millions of gallons of petroleum product or other chemical could thus escape and pollute the water.

Such leakage obviously can become a serious source of oil pollution in sunken or partially submerged ships, with oil flowing from bunkers as well as cargo. Moreover, such cargoes and bunkers are lost.

The present invention is another approach to the solution of the same basic problem to which U.S. Pat. No. 3,868,921 of Seymour et al. was directed; it may also be considered as an improvement over the invention of that patent. Among the objects of the invention are those of providing an overflow antipollution valve which:

a. does not restrict the vent or overflow passage area or otherwise prevent the vent or overflow function under normal operating conditions, b. acts as a closure device for vents of the type required by the American Bureau of Shipping, c. also automatically closes the vent or overflow pipe when the vessel is submerged, d. continues to admit water to enter the tank during the submerging process to equalize tank pressure with that of the surrounding sea, in order to avoid collapse of the ship's structure due to overpressure, e. once equilibrium is reached—that is, the vessel is on the bottom with sea and tank pressures equalized—is not opened by transient pressures from waves at the surface, f. operates independently of the ship's orientation, g. provides means for attaching a hose to enable a salvage ship to pump liquids out from the tanks of a sunken vessel, and h. can be installed on existing vessels with minimum alteration to the ship's structure.

SUMMARY OF THE INVENTION

The invention provides a combination venting and antipollution device for a shipboard liquid-storage tank having an opening at its upper end, with a vent and overflow conduit secured to the tank opening and extending upwardly from it. A vent opening at its upper end both vents the shipboard storage tank under normal conditions and seals it against leakage when the ship sinks.

A closure wall in the vent and overflow conduit divides that conduit into (a) a tank chamber below the wall and in direct communication with the tank through the tank opening, and (b) a vent space above the wall and in direct communication with the vent opening. This closure wall has a valve opening through it. A valve closure member capable of closing the valve opening is rigidly mounted to a shaft or stem. The shaft or stem is so mounted as to enable its limited reciprocating movement and thereby to enable the valve closure member to occupy (1) a central position closing the valve opening and preventing passage of fluid therethrough, (2) a lower position in the tank chamber enabling fluid passage through the valve opening and (3) an upper position in the vent space enabling passage of fluid through the valve opening.

Spring means bears, through spring-retaining sleeves, against the valve shaft and urges the valve closure member toward its central position. Low pressure in the tank results in moving the valve closure member down, against pressure of the spring means, into its lower position, to admit air to the tank. High pressure in the tank results in moving the valve closure member and valve shaft up, and this, too, compresses the spring means into its upper position to vent air from the tank.

A spill-lock chamber in the vent space above the valve closure member is closed at one end by a movable spill-lock piston. A hydrostatic pressure chamber open to the atmosphere lies near the spill-lock chamber and encloses a sealed bellows which is acted on by the pressure in the pressure chamber, the pressure inside the bellows being at approximately normal atmospheric pressure. A spill-lock valve is secured to the bellows and is open to the vent; this valve normally closes off the spill-lock chamber from the tank chamber and retains the spill-lock chamber at the pressure in the vent space.

If and when the ship sinks, however, the hydrostatic pressure chamber is soon subjected to hydrostatic pressure. This pressure compresses the bellows and actuates the spill-lock valve to close off the spill-lock chamber from the vent space and to send fluid from the tank chamber, at the pressure in the tank chamber, into the spill-lock chamber to bear upon the spill-lock piston. When the fluid at tank pressure bears on the spill-lock piston, this fluid pressure acts through a stem on the spill-lock piston to prevent the valve shaft and its valve closure member from moving up into its upper open position, until the pressure in the tank chamber reaches a predetermined level well above that then present in the vent space. However, the piston does not restrain the valve closure member from moving down into its lower position. Manual operation of the spill-lock valve is also possible.

The tank chamber also has a salvage opening, normally closed by a removable cap. Inside the tank chamber is a spring-urged locking means capable of engaging the valve shaft to lock the valve closure member in its central position. This locking means is disengaged from the shaft when the cap is in place on its salvage opening, and it engages with the shaft when and only when the cap is removed to open the salvage opening.

BRIEF DESCRIPTION OF THE DRAWINGS

In the drawings:

FIG. 2 is a view in side elevation of the valve of FIG. 1, taken along the line 2—2 in FIG. 1, with a portion broken away and shown in section and with the camlock salvage cap removed.

FIG. 3 is a fragmentary view in section taken along the line 3—3 in FIG. 1.

FIG. 4 is a fragmentary view taken along the line 4—4 in FIG. 1 and broken in about the middle.

FIG. 5 is a view similar to FIG. 1, except for some parts that have been broken off, showing the main valve in a lower open position, corresponding to tank pressure that is low relative to the pressure in the vent space, and also showing the spill-lock valve moved by compression of the bellows to a position closing off the spill-lock chamber from the vent space and opening it to the tank pressure.

FIG. 6 is a view taken along the line 6—6 in FIG. 5 but showing the main valve in an open upper position, corresponding to tank pressure higher than the pressure in the vent space.

FIG. 7 is a fragmentary view of a portion of the valve of FIG. 1 or 5, with the salvage cap removed (as in FIG. 2) and with the main valve locked in its closed central position.

FIG. 8 is an enlarged view in section taken along the line 8—8 in FIG. 2, showing the manually operated cam used for manual actuation of the spill-lock valve.

DESCRIPTION OF A PREFERRED EMBODIMENT

Figure 1:
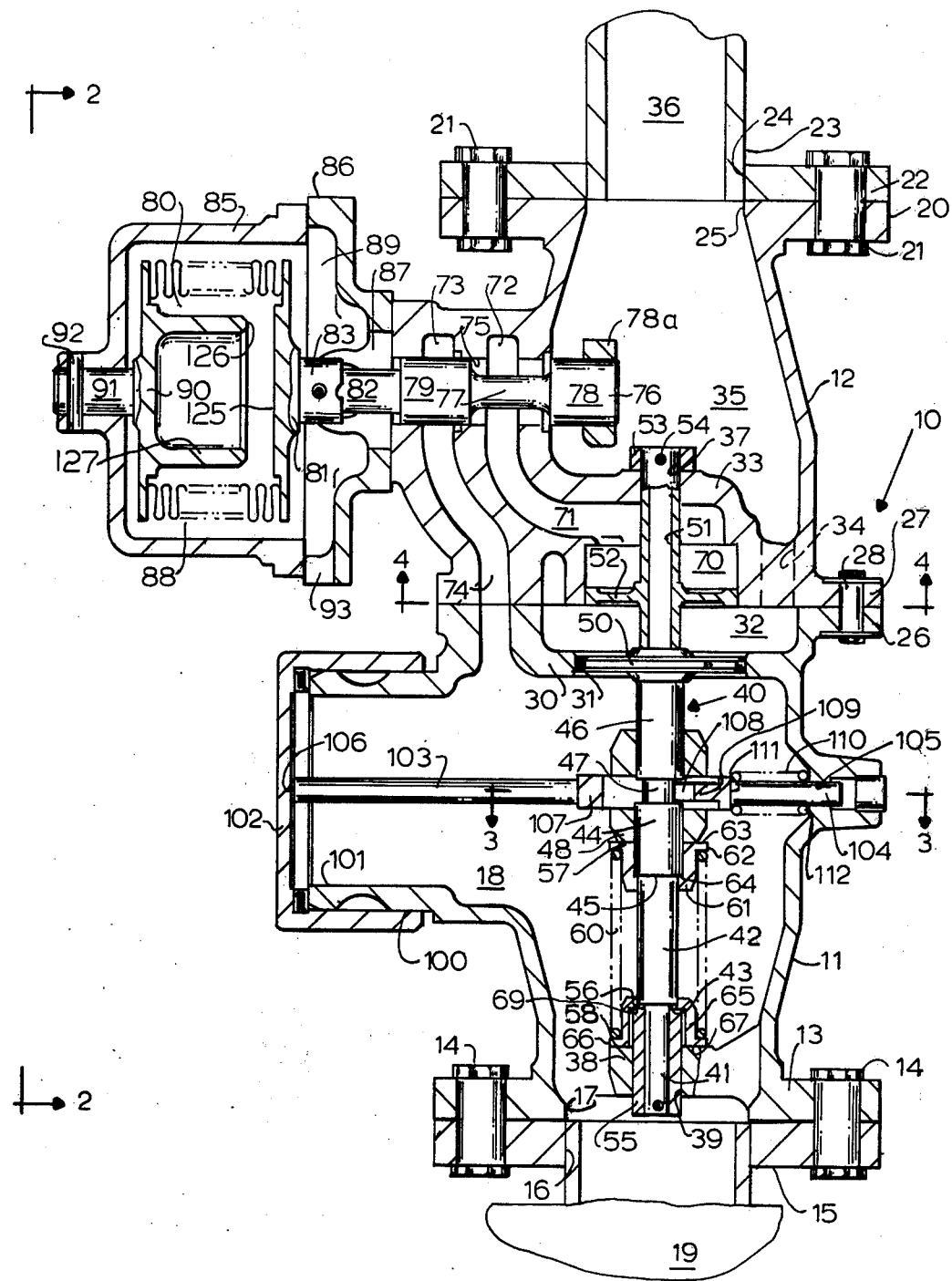
FIG. 1 is a view in front elevation and in section of a valve embodying the principles of the invention. The view is taken along the line 1—1 in FIG. 2.

The present invention includes a housing 10 which may be made up of a lower housing portion 11 and an upper housing portion 12. Preferably, all the parts of the device of this invention are made from corrosion-resistant metal, so that there is no dependency upon elastomeric members which might deteriorate. As shown in FIGS. 1 and 2, the lower housing portion 11 has a flange 13 which is secured as by bolts 14 to a flange 15 of a liquid storage tank 19. The liquid storage tank 19 has an opening 16 and directly above this is an opening 17 through the flange 13 leading into a lower or tank chamber 18. Similarly, the upper end of the housing member 12 has a flange 20 which can be bolted by bolts 21 to a flange 22 of a vent member 23 having an opening 24 aligned with an opening 25 at the upper end of the member 12. The upper end of the housing member 11 has a flange 26 and the lower end of the housing member 12 has a flange 27, and these are bolted together by bolts 28.

The lower housing member 11 has a web defining a closure portion 30 through which is a main valve opening 31 which leads into a recess 32. The upper housing member 12 has a web portion 33, connected to the flange 27, and passageways 34 connect the recess 32 to an upper vent space 35 leading to the vent 23, which defines a vent passageway 36. The web 33 has an opening 37 for a spill-lock valve stem 51. At the lower end of the lower chamber 11 is an integral lower bearing member 38 through which extends an opening 39 in line with the opening 37 and axially in line with the valve opening 31.

A main valve shaft or stem 40 is provided. At its lower end the stem 40 has a reduced diameter portion 41 which leads up to a larger diameter portion 42, joining it at a shoulder 43. The stem portion 42 leads up to a still larger-diameter portion 44, meeting it at a shoulder 45. The portion 44 is separated from a portion 46 of the same diameter by a reduced diameter portion 47. At the upper end of the stem 40, a main valve closure member or disc 50 is rigidly secured, as by brazing, to (or made integral with) the stem 40. The main valve disc 50 normally is located in the position shown in FIG. 1 in which it closes completely the opening 31. The stem 40 is slidable in an upper bearing member 48 which is an integral part of the lower housing 11, forming part of a perforate web 49.

Above the disc 50 is a spill-lock valve stem 51 which is integral with or to which is affixed a spill-lock piston 52, discussed later. At its upper end the stem 51 is provided with a shouldered cap or stop 53, which may be secured to it by a pin 54. The stem 51 is not connected to the stem 40 nor to the valve 50.

In the lower bearing 38 is a sleeve 55 which encircles and is pinned to the stem portion 41 and has an upper end surface 56. The sleeve 55 is larger in diameter than the stem portion 42 which it abuts at the shoulder 43. The upper bearing 48 has a lower end surface 57.

A spring 60 is interposed between the upper bearing surface 57 and a surface 58 atop the lower bearing 38. For this purpose, there is an upper spring-retaining sleeve 61 having a spring-receiving shoulder 62 and an end surface 63 which normally abuts the end 57 of the upper bearing 48, and the sleeve 61 also has an inturned lower end 64 for normal engagement with the shoulder 45 of the main stem 40, so that the sleeve 61 moves down when the stem 40 moves down. Similarly, a lower spring-receiving sleeve 65 is provided with a spring-receiving shoulder 66 and a lower end surface 67 which normally abuts the top surface 58 of the lower bearing 38. This sleeve 65 has an inturned portion 69 which normally engages the upper end 56 of the bearing 55, so that the sleeve 65 is carried up when the main stem 40 moves upwardly. The spring 60 is mounted so that at one end it engages the shoulder 63 of the sleeve 61 and at the other end engages the shoulder 66 of the sleeve 65. As a result, movement of the main stem 40 in either direction—up or down—compresses the spring 60.

The spring 60 urges the valve closure member or disc 50 toward its central position in the opening 31 and normally retains it there. If, however, a vacuum develops in the tank 19 (preferably to a value of about 1 p.s.i. below the ambient pressure in the vent space 35), then the pressure in the vent space 35 pushes the main disc 50 down (See FIG. 5) so that it no longer closes the opening 31, and air can then flow from the atmosphere vent conduit 36, and vent space 35 into the tank 19 via the chamber 18 to equalize the pressures. To move the main disc 50 down, the stem 40 must compress the spring 60, its shoulder 45 moving the spring sleeve 61 downwardly away from contact with the upper bearing 54. On the other hand, when the pressure in the tank 19 reaches a value which is higher than that in the ambient atmosphere, preferably by a value of about 1.5 p.s.i. above ambient pressure, then the stem 40 moves upwardly against the pressure of the spring 60, as shown in FIG. 6, the stem's lower sleeve 55 moving upwardly and carrying the spring-retaining sleeve 65 with it, so that the valve closure member 50 is forced upwardly into the space 32, again opening the communication between the chamber 18 and the vent space 35, so that the high pressure can be vented out through the vent 23. These are the normal pressure and vacuum relief actions of the valve 50, and they may take place at any time during a normal voyage.

However, the invention is designed also to have special operation if the ship should sink. For that purpose, the web 33 of upper housing member 12 is shaped to provide a cylindrical spill-lock chamber 70 in which moves the spill-lock piston 52 that is secured to the stem 51. As shown, the piston 52 is in its normal position. The chamber 70 is connected to a passageway 71 leading upwardly and outwardly therefrom into an annular chamber 72 which is normally (FIG. 1) in communication with the vent passage 35. Spaced from the annular chamber 72 is an annular chamber 73 which leads by a passageway 74 down into the main tank chamber 18. Both annular chambers 72 and 74 are joined to a cylindrical bore 75 which opens into the vent passage 35 and in which moves a spool valve 76 having a small diameter spool portion 77 lying between enlarged diameter cylindrical portions 78 and 79 which fill the bore 75. When the valve 76 is in its FIG. 1 position, the portion 78 is supported by a web portion 78a of the housing 12. Normally there is no flow between the chambers 72 and 73 and therefore between the passageways 71 and 74. However, when the spool valve 76 is moved to the left in FIG. 1, the spool portion 77 closes off the chamber 72 from the vent passage 35 and also connects the chambers 72 and 73; then fluid is able to pass from the chamber 18 via the passageways 74 and 71 into the spill-lock chamber 70 and thereupon to act upon the piston 52.

The spool valve 76 is connected to a metal bellows 80, at a movable end plate 81 thereof, by a portion 82 of the spool valve 76 being pinned to a socket member 83 forming part of the plate 81. This bellows 80 is enclosed by a pair of housing members 85 and 86, both bolted to the upper housing member 12 by bolts 84 (FIG. 2), the housing member 85 bearing against the housing member 86, which in turn bears against the housing 12 and has an opening 87 in alignment with the bore 75. The housing members 85 and 86 have mating recesses 88 and 89. A second fixed bellows plate 90 has a shaft-like portion 91 attached to it and pinned by a member 92 in a cylindrical opening through the housing member 85. An opening 93 through the housing member 86 leads into the recess 89 and serves as a passageway into the chambers 88,89 surrounding the bellows 80. Thus the recesses 88 and 89 comprise a hydrostatic pressure chamber open to the atmosphere and, if the vessel should sink, this chamber is open to the sea, so that water can flow into the chamber via the opening 93.

As a result of this construction, if the ship should sink, water would enter into the chambers 88,89 and exert pressure on the bellows 80, causing it to pull the spool valve 76 to the left in FIG. 1 and thereby causing the spool portion 77 to connect the passageways 74 and 71. This means that fluid in the chamber 18 at the tank pressure will flow into the chamber 70 and act on the spill-lock piston 52 to hold the valve closure member 50 against upward movement from its closed position until the pressure in the chamber 70 reaches a pre-set amount (e.g., 10 p.s.i.) above the pressure in the space 35. Thus the stem 51 then acts as extension means engaging the valve closure means 50 to hold it against upward movement. Downward opening of the valve member 50 by vacuum or low pressure in the space 18 is still, of course, possible on the same terms as before.

The invention also enables salvage operation to proceed conveniently. For this purpose, the lower housing member 11 has a cylindrical portion 100 with an opening 101, and this is closed by a suitable cam-lock cap 102, which can easily be released. The cam-lock cap 102 is removed for salvage operations and in all other instances is held in place.

Upon removal of the cap 102, the stem 40 is locked in the position where the valve 50 is held closed. This is accomplished by means of a cross shaft 103 having one end 104 engaged slidably in a suitable bore 105 provided in the lower housing 11. The other end 106 of the shaft 103 abuts the cap 102. As part of the cross shaft 103, or mounted to it, is a bifurcated portion 107 (See FIG. 3), which provides a slot 108 substantially the same diameter as or slightly larger than the reduced-diameter portion 47 of the stem 40 and smaller than the stem portions 44 and 46. At one end of the slot 108 is a locking detent 109 of a suitable size for fitting in between the stem portions 44 and 46. A spring 110 is seated between a shoulder 111 of the shaft 103 and a portion 112 of the lower housing 11 and is normally under compression. As a result, removal of the cap 102 causes the spring 110 to force the shaft 103 to be moved to the left and to carry the locking detent 109 to the left in FIG. 1, as shown in FIG. 7, the portion 107 moving through an opening 113 in the web 49, and thereby to engage in between the stem portions 44 and 46 of the stem 40 and hold the closure member 50 firmly in place in the valve opening 31.

Centering of the stem so that this action works is achieved simply because entry of liquid into the chamber 18 will at that time apply equal pressure on both sides of the closure member 50 and therefore will hold it in that position, where it is locked. Replacement of the cap 102 unlocks the shaft 103 from the stem 40 and permits the valve to operate as before.

The spool valve 76 can be moved manually by a handle 115 attached to a rotary shaft 116 longitudinally retained by a pin 117 in a bore 118. At the end of the shaft 116 is an eccentrically located cam member 120. Rotation of the handle 115 can cause the cam member 120 to bear against the end of the socket 83, thereby compressing the bellows 80 and moving the spool valve 76 to the left in FIG. 1 so as to close off the chamber 72 from the vent space 35 and send fluid from the passage 74 into the spill-lock chamber 70. Hydraulically or even electrically actuated means may be similarly provided if desired.

This manual operation may be used in several situations where the vessel has not sunk to protect the tanks and their liquid cargo. For example, it may be used when the vessel has gone aground in a storm to prevent oil in the tank 19 from getting out. Even when the vessel is afloat, if the tank 19 has been ruptured at or near its lower end, so that seawater would tend to enter and force the oil upwardly and out through the vent 23, the manual operation of the bellows 80 will send fluid under pressure into the spill-lock chamber 70 and will hold the valve closure member 50 down until tank pressure approaches a pre-set amount. The valve closure member 50 can always move upwardly, even against the pressure in the spill-lock chamber 70 before the pressure differential threatens the safety of the tank 19.

The bellows 80 may be made from relatively thin, light metal. However, if the pressure should rupture the bellows 80, it would have forced the plate 81 toward the plate 90, so that the surface 125 bears against a rim 126 (See FIG. 5) of an annular projection 127 of the bellows plate 90, and seals a chamber 128 (FIG. 5) holding the valve 76 in its open position. This precludes the mechanical spring effect of the ruptured bellows 80 from closing the valve 76.

To those skilled in the art to which this invention relates, many changes in construction and widely differing embodiment and applications of the invention will suggest themselves without departing from the spirit and scope of the invention. The disclosures and the description herein are purely illustrative and are not intended to be in any sense limiting.

I claim:

1. A combination venting and antipollution device for a shipboard liquid-storage tank having an opening at its upper end and a vent and overflow conduit secured to said tank opening, extending upwardly therefrom and having a vent opening at its upper end, said venting and antipollution device being effective to both vent the shipboard storage tank and seal it against leakage when the ship sinks, including in combination:
    a closure wall in said conduit dividing said conduit into a tank chamber on one side of said wall in direct communication with said tank through said tank opening, and vent space on the other side of said wall in direct communication with said vent opening, said closure wall having a valve opening therethrough,
    a valve closure means for normally closing said valve opening,
    first relief means responsive to low pressure in the tank relative to that in the vent space for moving said valve closure means into a first open position, to admit air to said tank, and
    second relief means responsive to high pressure in the tank relative to that in the vent space for moving said valve closure means into a second open position, to vent air from said tank,
    walls secured to said conduit defining a hydrostatic pressure chamber open to the atmosphere,
    a sealed bellows in said pressure chamber and acted on by the pressure in said pressure chamber, the pressure inside said bellows being at approximately normal atmospheric pressure,
    a spill-lock chamber in said vent space in line with said valve closure means,
    a spill-lock piston having an extension means for engaging said valve closure means when that is in its closed position, said piston being snugly movable in said spill-lock chamber and constituting a wall thereof,
    valving means secured to said bellows for normally closing off said spill-lock chamber from said tank chamber and connecting it to said vent space, and, in an open position, for closing off said spill-lock chamber from said vent space and sending fluid from said tank chamber at the pressure in said tank chamber into said spill-lock chamber to bear upon said spill-lock piston when the pressure in said hydrostatic pressure chamber acts to compress said bellows, as at a pressure corresponding with the sinking of the ship below the surface of the sea,
    said tank pressure when bearing on said spill-lock piston serving to prevent said valve closure means from moving up into its second open position until the pressure in said tank chamber reaches a predetermined level well above that then present in said vent space but not restraining said valve closure means from moving down into its first open position if the pressure in the tank chamber is lower than the pressure in the vent space.

2. The device of claim 1 having means for manually moving said bellows to activate its valving means to its said open position.

3. The device of claim 1 wherein
    said tank chamber has a salvage opening and a removable cap normally closing said salvage opening,
    spring-urged locking means in said tank chamber for engaging and locking the valve closure means in its closed position,
    said locking means being disengaged from said valve closure means when said cap is in place on said salvage opening, and engaged with said stem when said cap is removed.

4. A combination venting and antipollution device for a shipboard liquid-storage tank having an opening at its upper end and a vent and overflow conduit secured to said tank opening, extending upwardly therefrom and having a vent opening at its upper end, said venting and antipollution device being effective to both vent the shipboard storage tank and seal it against leakage when the ship sinks, including in combination:
    a closure wall in said conduit dividing said conduit into a tank chamber on one side of said wall in direct communication with said tank through said tank opening, and vent space on the other side of said wall in direct communication with said vent opening, said closure wall having a valve opening therethrough,
    a valve stem in said tank chamber,
    a valve closure member at one end of said stem for normally closing said valve opening, stem mounting means secured to said conduit for enabling limited reciprocating movement of said stem and for enabling said valve closure member to occupy (1) a central position closing said valve opening and preventing passage of fluid therethrough, (2) a first open position in said tank chamber enabling fluid passage through said valve opening and (3) a second open position in said vent space enabling passage of fluid through said valve opening, spring means bearing between said stem and said stem mounting means for urging said valve closure member toward its central position and operating so that low pressure in the tank relative to that in the vent space results in moving said valve closure member against pressure of said spring means into its first open position, to admit air to said tank, and high pressure in the tank relative to that in the vent space results in moving said valve closure member up against pressure of said spring means into its second open position, to vent air from said tank, walls secured to said conduit defining a hydrostatic pressure chamber open to the atmosphere, a sealed bellows in said pressure chamber and acted on by the pressure in said pressure chamber, the pressure inside said bellows being at approximately normal atmospheric pressure, a spill-lock chamber in said vent space in line with said valve closure member, a spill-lock piston having an extension means for engaging said valve closure member when that is in its closed position, said piston being snugly movable in said spill-lock chamber and constituting a wall thereof, valving means secured to said bellows for normally closing off said spill-lock chamber from said tank chamber and connecting it to said vent space, and, in an open position, for closing off said spill-lock chamber from said vent space and sending fluid from said tank chamber at the pressure in said tank chamber into said spill-lock chamber to bear upon said spill-lock piston when the pressure in said hydrostatic pressure chamber acts to compress said bellows, as at a pressure corresponding with the sinking of the ship below the surface of the sea, said tank pressure when bearing on said spill-lock piston serving to prevent said valve closure member from moving up into its second open position until the pressure in said tank chamber reaches a predetermined level well above that then present in said vent space but not restraining said valve closure member from moving down into its first open position if the pressure in the tank chamber is lower than the pressure in the vent space.

5. The device of claim 4 having means for manually moving said bellows to activate its valving means to the open position.

6. The device of claim 4 wherein said tank chamber has a salvage opening and a removable cap normally closing said salvage opening, spring-urged locking means in said tank chamber for engaging said valve stem and thereby locking the valve closure member in its central position, said locking means being disengaged from said stem when said cap is in place on said salvage opening, and engaged with said stem when said cap is removed.

7. The device of claim 6, wherein said stem has a recessed portion and said locking means includes a cross-shaft, perpendicular to said stem and having a locking detent and a bifurcated portion surrounding said stem, said cross-shaft being supported by said conduit for sliding movement, a spring bearing between said cross-shaft and said housing and tending to urge said locking detent into engagement with said stem's portion, said cap when closed pushing said cross-shaft against the pressure of that spring to move said locking detent away from said stem.

8. The device of claim 4 wherein said stem has a reduced-diameter portion extending between two shoulders, said spring means having a pair of sleeves bearing one against each of said shoulders and a spring bearing against said sleeves, and stop means limiting movement of said sleeves away from each other.

9. A combination venting and antipollution device for a shipboard liquid-storage tank having an opening at its upper end connected to a vent and overflow conduit having a vent opening at its upper end, including in combination:

a vertically-extending hollow housing in between said tank opening and said conduit having a horizontal closure wall dividing said housing into a tank chamber below said wall in direct communication with said tank through said tank opening, and vent space above said wall in direct communication with said vent opening, said closure wall having a valve opening therethrough, valve closure means capable of closing said valve opening, first pressure relief means actuated by low pressure in the tank, relative to that in said vent space, for moving said valve closure means into a first open position, to admit air to said tank and second pressure relief means actuated by high pressure in the tank, relative to that in said vent space for moving said valve closure means into a second open position, to vent air from said tank, said housing also defining a hydrostatic pressure chamber open to the atmosphere, a sealed bellows in said pressure chamber and acted on by the pressure in said pressure chamber, the pressure inside said bellows being at approximately normal atmospheric pressure, a spill-lock chamber in said vent space in line with and above said closure wall, a spill-lock piston having an extension portion spacing it from said valve closure means and normally bearing against it, said piston being movable in said spill-lock chamber, constituting a lower wall thereof, valving means secured to said bellows for normally closing off said spill-lock chamber from said tank chamber and opening it to said vent space, said valving means having an open position for closing off said spill-lock chamber from said vent space and for sending fluid from said tank chamber at the pressure in said tank chamber into said spill-lock chamber to bear upon said spill-lock piston when said hydrostatic pressure chamber is at a pressure corresponding with the sinking of the ship below the surface of the sea, said tank pressure when bearing on said spill-lock piston serving to prevent said valve closure means from moving into its second open position until the pressure in said tank chamber reaches a predetermined level well above that then present in said vent space.

10. The device of claim 9 having means for manually moving said bellows to activate its valving means to the open position.

11. The device of claim 9 wherein
said housing has a salvage opening and a removable cap normally closing said salvage opening,
spring-urged locking means in said tank chamber supported by said housing for engaging said valve closure means and locking it in its closed position when said cap is removed,
said cap, when in place, disengaging said locking means from said valve closure means.

12. A combination venting and antipollution device for a shipboard liquid-storage tank having an opening at its upper end connected to a vent and overflow conduit having a vent opening at its upper end, including in combination:
a vertically-extending hollow housing in between said tank opening and said conduit having a horizontal closure wall dividing said housing into a tank chamber below said wall in direct communication with said tank through said tank opening, and vent space above said wall in direct communication with said vent opening, said closure wall having a valve opening therethrough,
a valve stem extending transversely to said closure wall in said tank chamber,
a horizontal valve closure member rigidly mounted to one end of said stem and capable of closing and valve opening,
stem mounting means on said housing for enabling limited vertical reciprocating movement of said stem and for enabling said valve closure member to occupy (1) a central position closing said valve opening and preventing passage of fluid therethrough, (2) a lower position in said tank chamber enabling fluid passage through said valve opening, and (3) an upper position in said vent space enabling passage of fluid through said valve opening,
spring means bearing between said stem and said stem mounting means for urging said valve closure member toward its central position and for acting so that
low pressure in the tank, relative to that in said vent space, results in moving said valve closure member down against pressure of said spring means into its lower position, to admit air to said tank and
high pressure in the tank, relative to that in said vent space, results in moving said valve closure member up against pressure of said spring means into its upper position, to vent air from said tank,,
said housing also defining a hydrostatic pressure chamber open to the atmosphere,
a sealed bellows in said pressure chamber and acted on by the pressure in said pressure chamber, the pressure inside said bellows being at approximately normal atmospheric pressure,
a spill-lock chamber in said vent space in line with and above said closure wall,
a spill-lock piston having an extension portion spacing it from said valve closure member normally bearing against it, said piston being movable in said spill-lock chamber, constituting a lower wall thereof,
valving means secured to said bellows for normally closing off said spill-lock chamber from said tank chamber and opening it to said vent space, said valving means having an open position for closing off said spill-lock chamber from said vent space, and for sending fluid from said tank chamber at the pressure in said tank chamber into said spill-lock chamber to bear upon said spill-lock piston when said hydrostatic pressure chamber is at a pressure corresponding with the sinking of the ship below the surface of the sea,
said tank pressure when bearing on said spill-lock piston serving to prevent said valve closure member from moving up into its upper position until the pressure in said tank chamber reaches a predetermined level well above that then present in said vent space.

13. The device of claim 12 having means for manually moving said bellows to activate its valving means to the open position.

14. The device of claim 12 wherein
said housing has a salvage opening and a removable cap normally closing said salvage opening,
spring-urged locking means in said tank chamber supported by said housing for engaging said stem and locking the valve closure member in its central position when said cap is removed,
said cap, when in place, disengaging said locking means from said stem.

15. A combination venting and antipollution method for use with a shipboard liquid-storage tank having an opening at its upper end and a vent and overflow conduit secured to said tank opening and extending upwardly therefrom and having a vent opening at its upper end for both venting the shipboard storage tank and for sealing it against leakage when the ship sinks, including in combination:
normally closing off said conduit so as to divide said conduit into a tank chamber in direct communication with said tank through said tank opening, and vent space in direct communication with said vent opening, said vent space having a spill-lock chamber,
opening said tank chamber to said vent space when there is low pressure in the tank relative to that in the vent space, to admit air to said tank,
opening said tank chamber to said vent space when there is high pressure in the tank relative to that in the vent space, to vent air from said tank,
normally closing off said spill-lock chamber from said tank chamber and connecting it to said vent space,
at a pressure corresponding with the sinking of the ship below the surface of the sea sending fluid from said tank chamber at the pressure in said tank chamber into said spill-lock chamber,
said tank pressure when transmitted to said spill-lock chamber serving to prevent high pressure in said tank from opening said tank chamber to said vent space until the pressure in said tank chamber reaches a predetermined level well above that then present in said vent space, while not restraining the opening of said tank chamber to said vent space when the pressure in the tank chamber is lower than the pressure in the vent space.

16. A combination venting and antipollution method for use with a shipboard liquid-storage tank having an opening at its upper end connected to a vent and overflow conduit comprising:

normally closing off the conduit so as to divide the conduit into a tank chamber in direct communication with the tank through the tank opening, and vent space in direct communication with the vent opening;

opening the tank chamber to the vent space when there is low pressure in the tank relative to that in the vent space, to admit air to the tank;

opening the tank chamber to the vent space when there is high pressure in the tank relative to that in the vent space, amounting to a predetermined pressure differential between the tank and the vent space, to vent air from the tank; and at a pressure corresponding with the sinking of the ship below the surface of the sea, increasing the pressure differential at which high pressure is vented by opening the tank chamber to the vent space, thereby tending to prevent outflow of fluid from the tank after the ship has sunk except under unusually high tank pressure relative to ambient pressure.

17. A combination venting and antipollution device for a shipboard liquid-storage tank having an opening at its upper end connected to a vent and overflow conduit having a vent opening at its upper end including in combination:

a closure wall in the conduit, dividing the conduit into a tank chamber on one side of the wall in direct communication with the tank through the tank opening, and a vent space on the other side of the wall in direct communication with the vent opening, said closure wall having a valve opening therethrough, a valve closure means for normally closing said valve opening;

first relief means responsive to low pressure in the tank relative to that in the vent space for moving the valve closure means into a first open position, to admit air to said tank, second relief means responsive to high pressure in the tank relative to that in the vent space, effective when said high pressure reaches a predetermined pressure differential above the vent space pressure to move the valve closure means into a second open position, to vent air from the tank, and ambient pressure responsive means effective upon sinking of the ship to increase the pressure differential required to move the valve closure means into the second open position;

whereby after sinking of the ship the valve closure means remains closed unless tank pressure reaches an unusually high level relative to ambient pressure, thereby helping prevent outflow of a liquid cargo stored in the tank.

18. The venting and antipollution device of claim 17 wherein said tank chamber has a salvage opening and a removable cap normally closing said salvage opening, and further including spring-urged locking means in the tank chamber for engaging and locking the valve closure means in its closed position, said locking means being disengaged from said valve closure means when said cap is in place on said salvage opening, and engaged with said stem when said cap is uncovered.

19. The venting and antipollution device of claim 17 wherein said ambient pressure responsive means comprises:

bellows means attached to the conduit and including a reciprocable extension, for moving the extension from a first normal position to a second, ship-sunk position at a high level of ambient pressure corresponding to the sinking of the ship below the surface of the sea;

a spill-lock chamber in the vent space in line with the valve closure means;

a spill-lock piston having an extension means for engaging the valve closure means when that is in its closed position, said piston being snugly movable in the spill-lock chamber and constituting a wall thereof, valving means secured to the reciprocable extension of the bellows means for normally closing off the spill-lock chamber from the tank chamber and connecting it to the vent space when said reciprocable extension is in the first position for communicating the pressure in said tank chamber to the spill-lock chamber to allow said pressure to bear upon the spill-lock piston when the reciprocable extension is moved to the second, ship-sunk position;

said tank pressure when bearing on the spill-lock piston serving to prevent the valve closure means from moving up into its second open position until the pressure in the tank chamber reaches a predetermined level well above that then present in the vent space but not restraining the valve closure means from moving down into its first open position if the pressure in the tank chamber is lower than the pressure in the vent space.

20. The venting and antipollution device of claim 19 having means for manually moving the bellows means to activate the valving means to its open position.

21. A combination venting and antipollution device for a shipboard liquid-storage tank, comprising:

first relief valve means associated with the tank and responsive to low pressure in the tank relative to ambient pressure for admitting air to the tank;

second relief valve means associated with the tank and tank pressure a predetermined pressure differential above ambient for venting pressure from the tank; and ambient pressure responsive means associated with the second relief valve means and effective upon sinking of the ship to increase the pressure differential required to vent pressure from the tank;

whereby after sinking of the ship the second relief valve means remains closed unless tank pressure reaches an unusually high level relative to ambient, thereby helping revent outflow of a liquid cargo stored in the tank.

22. The venting and antipollution device of claim 21 wherein said first and second relief valve means comprise a single reciprocable valve, spring-biased toward a central closed position in a valve seat with one face of the valve exposed to tank pressure and the other to ambient pressure, said valve being movable against the spring bias to a first open position in one direction from the seat under the influence of low tank pressure and to a second open position in the opposite direction from the seat under the influence of high tank pressure.

23. The venting and antipollution device of claim 22 wherein said ambient pressure responsive means comprises a fluid chamber, a piston within the fluid chamber aligned with the valve, said piston being of smaller area than the valve and having an extension means for engaging the valve when the valve is in its closed position, and means for communicating tank pressure to the fluid chamber and the piston to exert a restraining force on the valve to increase the pressure differential required to move the valve to said second open position without affecting the operation of the valve under low tank pressure.

24. The venting and antipollution device of claim 22, further including a salvage opening communicating with the tank and a removable cap normally closing the salvage opening, and spring-urged locking means for engaging and locking the reciprocable valve in its central closed position, said locking means being disengaged from the reciprocable valve when the cap is in place on the salvage opening, and engaged with the valve when the cap is removed.

* * * * *